US012565929B2

(12) United States Patent      (10) Patent No.:   US 12,565,929 B2

Muster et al.      (45) Date of Patent:     Mar. 3, 2026

(54) LOCK ASSEMBLY FOR LINEAR ACTUATORS

(71) Applicant: Woodward, Inc., Fort Collins, CO (US)

(72) Inventors: William Muster, Park Ridge, IL (US); Joseph Kopecek, Santa Clarita, CA (US)

(73) Assignee: Woodward, Inc., Fort Collins, CO (US)

( * ) Notice: Subject to any disclaimer, the term of this patent is extended or adjusted under 35 U.S.C. 154(b) by 0 days.

(21) Appl. No.: 18/984,298

(22) Filed: Dec. 17, 2024

(65) Prior Publication Data

US 2025/0283532 A1     Sep. 11, 2025

Related U.S. Application Data

(60) Provisional application No. 63/611,619, filed on Dec. 18, 2023.

(51) Int. Cl.
| | |
|---|---|
| *F16H 63/34* | (2006.01) |
| *F16H 25/20* | (2006.01) |
| *F16H 25/22* | (2006.01) |

(52) U.S. Cl.
CPC ..... *F16H 63/3441* (2013.01); *F16H 25/2015* (2013.01); *F16H 25/2204* (2013.01); *F16H 63/3475* (2013.01)

(58) Field of Classification Search
CPC ............. F16H 63/3441; F16H 63/3475; F16H 25/2015
See application file for complete search history.

(56) References Cited

U.S. PATENT DOCUMENTS

| | | | | |
|---|---|---|---|---|
| 5,467,661 | A | * | 11/1995 | Lange ................. F16H 25/2204 |
| | | | | 74/424.82 |
| 8,715,132 | B2 | | 5/2014 | Kopecek |
| 8,844,389 | B2 | | 9/2014 | Kopecek |
| 2020/0292009 | A1 | | 9/2020 | Kajikawa |

FOREIGN PATENT DOCUMENTS

| | | | | |
|---|---|---|---|---|
| CN | 103362688 A | | 10/2013 | |
| DE | 102015220168 A1 | * | 6/2016 | ......... F16H 25/2454 |

OTHER PUBLICATIONS

Int'l Search Report and Written Opinion Appln No. PCT/US2024/060687 mailed Mar. 12, 2025.

* cited by examiner

*Primary Examiner* — Randell J Krug

(74) *Attorney, Agent, or Firm* — McAndrews Held & Malloy, Ltd.

(57) ABSTRACT

Methods and systems for a lock assembly for a linear actuator. The lock assembly includes a ball nut having one or more rows of lock protrusions extending axially from an external circumference of the ball nut. A lock rotor encircles the ball nut, the lock rotor having a row of ridge protrusions extending axially inward from an internal circumference. In a lock position, the ridge protrusions are arranged between locking protrusions. In an unlocked position, the ridge protrusions are arranged between adjacent locking protrusions.

20 Claims, 12 Drawing Sheets

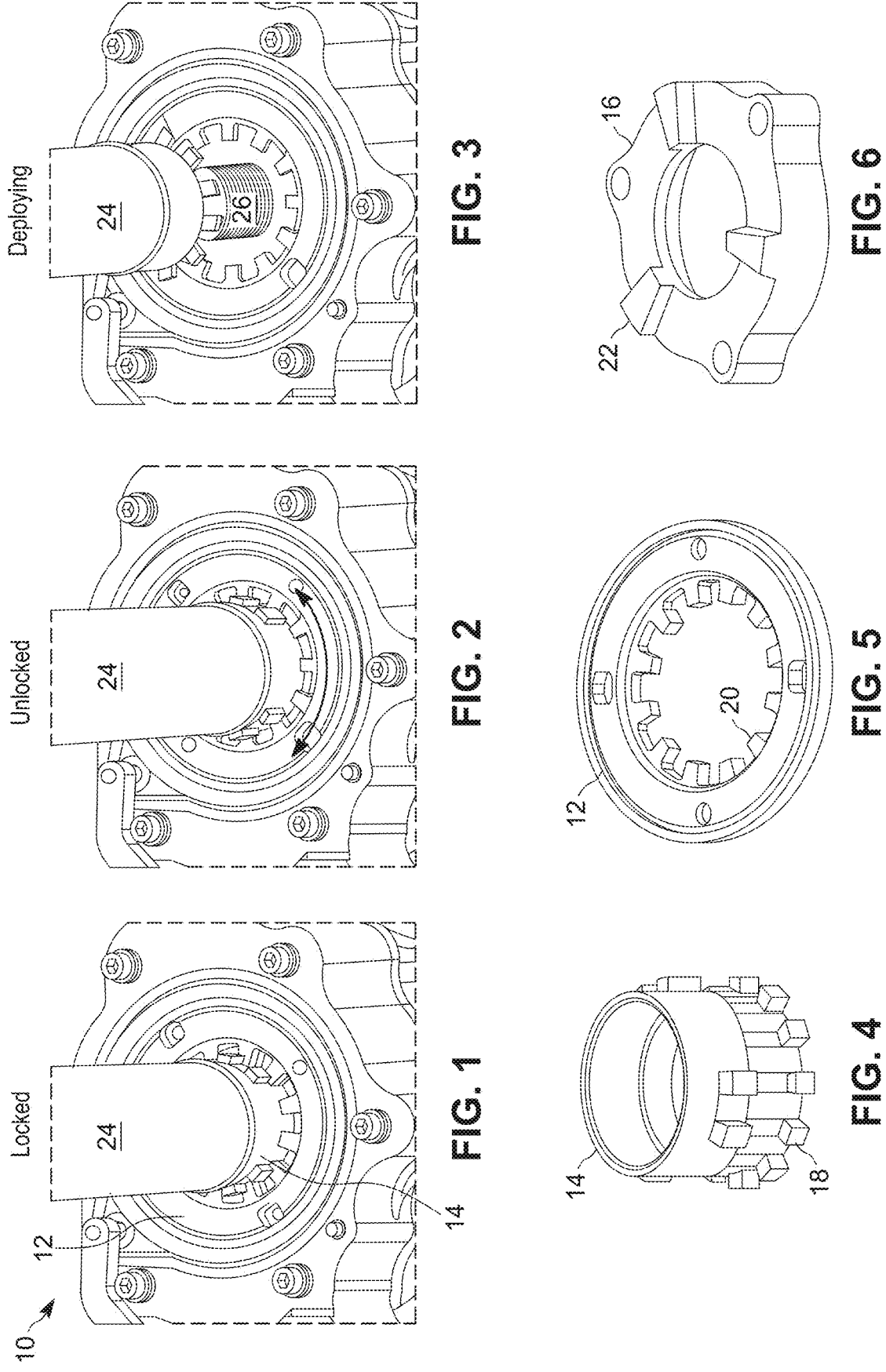

LOCK ASSEMBLY FOR LINEAR ACTUATORS

CROSS REFERENCE TO RELATED APPLICATIONS

This application is a Non-Provisional Patent application claiming priority to U.S. Provisional Patent Application No. 63/611,619 entitled "Lock Assembly For Linear Actuators" filed Dec. 18, 2023, which is herein incorporated by reference in its entirety.

FIELD

The present disclosure relates generally to linear actuators. More particularly, aspects of the disclosed embodiments relate to linear actuators that can be locked in position.

BACKGROUND

Locking a position of a linear actuator often employs hydraulics, which can be heavy, costly, complex, and require frequent maintenance. Therefore, a simple system that provides an electrically actuated locking mechanism is desirable.

Further limitations and disadvantages of conventional and traditional approaches will become apparent to one of skill in the art, through comparison of such systems with the present disclosure as set forth in the remainder of the present application with reference to the drawings.

BRIEF SUMMARY

Methods and systems for a lock assembly for a linear actuator. The lock assembly includes a ball nut having one or more rows of lock protrusions extending axially from an external circumference of the ball nut. A lock rotor encircles the ball nut, the lock rotor having a row of ridge protrusions extending axially inward from an internal circumference. In a lock position, the ridge protrusions are arranged between locking protrusions along the row of lock protrusions. In an unlock position, the ridge protrusions are arranged between adjacent locking protrusions along the row.

These and various other advantages, aspects and novel features of the present disclosure, as well as details of an illustrated embodiment thereof, will be more fully understood from the following description and drawings.

BRIEF DESCRIPTION OF SEVERAL VIEWS OF THE DRAWINGS

FIGS. 1 to 3 illustrates a perspective view of an example lock rotor assembly transitioning from a locked to an unlocked to a deployed configuration, in accordance with an example embodiment of the disclosure.

FIGS. 4 to 6 illustrates example components of the example lock rotor assembly of FIG. 1, in accordance with an example embodiment of the disclosure.

The figures are not necessarily to scale. Where appropriate, similar or identical reference numbers are used to refer to similar or identical components.

DETAILED DESCRIPTION

Figure 7:
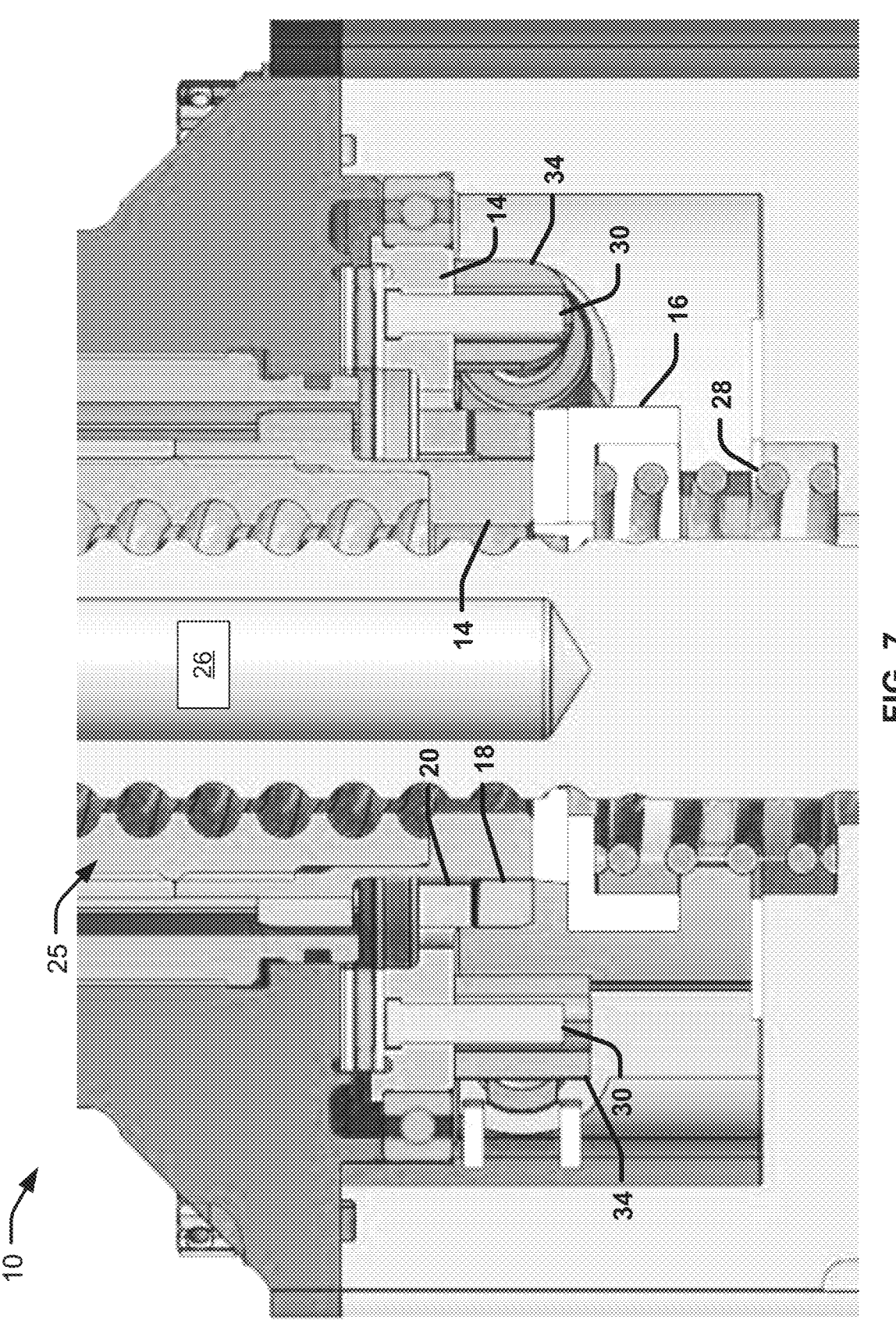
FIG. 7 illustrates a cross-sectional perspective view of the lock assembly of FIG. 1 in a locked position, in accordance with an example embodiment of the disclosure.

Disclosed are methods and systems for a lock assembly for a linear actuator. The lock assembly includes a ball nut having one or more rows of lock protrusions extending axially from an external circumference of the ball nut. A lock rotor encircles the ball nut, the lock rotor having a row of ridge protrusions extending axially inward from an internal circumference. In a lock position, the ridge protrusions are aligned with the locking protrusions. In an unlocked position, the ridge protrusions are misaligned, such that they are arranged between adjacent locking protrusions.

The commercial aircraft industry is moving towards a more electric aircraft platform, which favors electric actuation of moving parts, which includes replacing conventional Hydraulic Thrust Reverser Actuation Systems (HTRAS) with Electro-Mechanical Thrust Reverser Actuation Systems (EMTRAS).

TRAS actuators are required to have robust locking mechanisms to prevent inadvertent deployment. EMTRAS actuators will employ electrically actuated locking mechanism to realize the full benefit of moving towards a more electric aircraft.

The disclosed lock assembly performs a primary locking function for TRAS. For example, the disclosed lock assembly employs a ball nut that is prevented from moving when locked, but allows movement of the ball nut when unlocked. Advantageously, the lock assembly is independently controlled (independent of the linear actuator), and is configured to automatically lock when no power applied to the actuator, e.g., in stop position. This is due to a system of springs to bias assembly components to remain locked when no power is present and the ball nut is in a locked or stowed position.

In disclosed examples, a lock rotor of the lock assembly can be positioned to either block or allow a lock nut to pass through the lock rotor. The lock nut can be attached to the linear output of an actuator. For instance, a lock rotor can be rotated into a locked and/or unlocked position by a linear device (in some cases, a solenoid) that can be commanded independently from other devices (e.g., other components of a system in which the lock assembly is operating).

In some example disclosed examples, a rotary device (e.g., a motor, etc.) rather than a linear device could be used to rotate the locking assembly. In the absence of power to the assembly, the lock rotor can be held in position by a bias spring (e.g., when in a locked configuration) or a lock follower (e.g., when in an unlocked configuration). For instance, the bias spring can hold the lock rotor in the locked position when the lock (or ball) nut is in a stow position, and the solenoid is unpowered.

To ensure smooth operation of the components of the rotational locking assembly in a linear activation, the lock rotor and/or positioning mechanism (e.g., guides, rods, etc.) are mass balanced to prevent vibration caused by rapid movement from unlocking the assembly. However, mass balancing may not be implemented for a rotary locking mechanism.

To provide flexibility during maintenance, the lock rotor can be externally unlocked from the locked position. However, this movement cannot take place during normal operation (e.g., when the system in which the assembly is positioned is operational).

In one implementation, the teeth of the lock rotor and the lock nut can be profiled such that torque will be generated to move the lock open resulting in free movement rather than concentrating loads onto a small contact patch. This prevents damage to the mechanism if the lock nut and lock rotor contact when the lock is not fully unlocked.

Advantageously, the disclosed lock assembly prevents linear output from extending when locked, while allowing linear output to move when unlocked. Further, the lock assembly accepts commands independent of other parts of the system. The assembly is configured to automatically lock in the absence of power, when the actuator moves into the locked position. The resulting design is resistant to damage.

Furthermore, the simple and discreet movements required allow for a low duty cycle power device to unlock or lock the assembly. Moreover, the mechanical arrangement of the components allows for manual unlocking during maintenance operations.

In disclosed examples, a lock assembly for a linear actuator includes a ball nut having one or more rows of lock protrusions extending axially from an external circumference of the ball nut; and a lock rotor configured to encircle the ball nut, the lock rotor having a row of ridge protrusions extending axially inward from an internal circumference, wherein the ridge protrusions are aligned with locking protrusions of the one or more rows of lock protrusions when the linear actuator is in a first position, and are misaligned with the locking protrusions of the one or more rows of lock protrusions when the linear actuator is in a second position.

In some examples, the linear actuator is connected to a first rod coupled to a pin, such that movement of the linear actuator from the first to the second position moves the pin.

In examples, the pin is further connected to the lock rotor, such that movement of the pin causes rotational movement of the lock rotor.

In some examples, the lock assembly further includes a second rod arranged opposite the first rod relative to the lock nut; and a housing to support the first and second rods, the housing including one or more cavities to receive the first and second rods during movement of the linear actuator.

In some examples, the lock assembly further includes a balance weight attached to the second rod.

In some examples, the lock assembly further includes a lock follower biased toward the lock nut or the lock rotor by the spring.

In examples, the lock follower is configured to maintain a radial position of the lock nut in the locked position, and a radial position the lock rotor in the unlocked position.

In examples, the linear actuator is a solenoid.

In some disclosed examples, a lock assembly includes a lock nut having a plurality of lock protrusions extending axially from an external circumference of the lock nut; a lock rotor configured to encircle the lock nut, the lock rotor having a plurality of protrusions extending axially inward from an internal circumference; and a linear actuator connected to the lock rotor and configured to move the lock rotor from a locked position to an unlocked position.

In some examples, the lock assembly further includes the one or more rods, wherein the linear actuator is connected to the lock rotor via one or more pins connected to the one or more rods.

In some examples, the lock assembly further includes a balancing volume fixed to a rod of the one or more rods.

In some examples, the lock assembly further includes a lock follower biased toward the lock nut and the lock rotor by the spring, the lock follower having one or more posts arranged on one or more portions of the lock follower.

In some examples, the lock assembly further includes one or more sensors arranged about the lock follower, the lock follower having one or more posts to activate the sensor.

In examples, the lock follower is configured to maintain a radial position of the lock nut in the locked position, and a radial position the lock rotor in the unlocked position.

In examples, one or more of the plurality of ridge protrusions has a substantially angled portion configured to overlap an opposing substantially angled portion of one or more of the plurality of lock protrusions.

In examples, forcing the substantially angled portion of the one or more of the plurality of ridge protrusions against the opposing substantially angled portion of one or more of the plurality of lock protrusions causes the plurality of ridge protrusions and the plurality of lock protrusions to misalign, allowing the plurality of ridge protrusions to pass into spaces between the opposing plurality of lock protrusions, resulting in an unlocked configuration.

In some disclosed examples, a lock assembly for a linear actuator includes a ball nut having one or more rows of lock protrusions extending axially from an external circumference of the ball nut; and a lock rotor configured to encircle the ball nut, the lock rotor having a row of ridge protrusions extending axially inward from an internal circumference, wherein the ridge protrusions are arranged between locking protrusions of the one or more rows of lock protrusions in a lock position, and are arranged between adjacent locking protrusions of the one or more rows of lock protrusions in an unlock position.

In some examples, the lock assembly further includes a solenoid to rotate the lock rotor.

In some examples, the lock assembly further includes a spring to bias the solenoid such that the lock rotor is in a lock position in the absence of power.

In some examples, the lock assembly further includes a lock follower to maintain the lock rotor in an unlock position in the absence of the ball nut.

In some examples, the lock assembly further includes one or more springs to bias the lock follower against the ball nut in a lock position.

In examples, the one or more rows comprises first and second rows separated by a channel.

As utilized herein, "and/or" means any one or more of the items in the list joined by "and/or". For example, "x and/or y" means any element of the three-element set {(x), (y), (x, y)}. Similarly, "x, y, and/or z" means any element of the seven-element set {(x), (y), (z), (x, y), (x, z), (y, z), (x, y, z)}. As utilized herein, the term "module" refers to functions that can be implemented in hardware, software, firmware, or any combination of one or more thereof. As utilized herein, the term "exemplary" means serving as a non-limiting example, instance, or illustration.

Turning now to the figures, FIG. 1 illustrates a perspective view of an example lock rotor assembly 10.

The assembly includes a ball nut 14 that is locked or unlocked by rotation of a lock rotor or plate 12. The ball nut 14 can be connected to a shaft 24 connected to an end effector, or other system for activation. For example, rotation of the lock rotor 12 can be controlled by a motor or solenoid, which can cause the lock rotor 12 to rotate from a locked position (shown in FIG. 1) to an unlocked position (shown in FIG. 2). Once unlocked, the ball nut 14 can disengage from the lock rotor 12, freeing the shaft 24 to move away from the lock rotor assembly 10.

FIGS. 4 to 6 illustrate examples of one or more components that enable movement of the lock rotor assembly 10. As shown, FIG. 4 illustrates the ball nut 14, which includes one or more rows of lock protrusions 18 extending axially from an external circumference of the ball nut 14. The lock rotor 12 shown in FIG. 5 is configured to encircle the ball nut 14, as shown in FIGS. 1 to 3, with the lock rotor 12 having one or more rows of ridge protrusions 20 extending axially inward from an internal circumference.

With reference to FIG. 1, in a locked configuration the ridge protrusions 20 are radially aligned with the lock protrusions 18, thereby preventing axial movement (e.g., deployment) of the ball nut 14. As shown in FIG. 2, in an unlocked configuration the ridge protrusions 20 are radially misaligned with the lock protrusions 18. In other words, spaces between adjacent ridge protrusions 20 are sized to allow the lock protrusions 18 to pass within the inner circumference of the lock rotor 12.

FIG. 6 provides a perspective view of a lock follower 16. In operation, the lock follower 16 is arranged opposite the ball nut 14 relative to the position of the lock rotor 12, and biases the lock nut 12 toward the lock rotor 12 in the lock position. The lock follower 16 helps maintain a position of the lock rotor 12 in an unlocked and/or deployed configuration.

FIG. 7 illustrates a cross-sectional perspective view of the lock assembly 10 in a locked position. As shown, the ridge protrusions 20 of the lock nut 14 are radially aligned with the lock protrusions 18, thereby preventing coaxial translation of the ball nut 14. The lock nut 14 is held in place by the lock follower 16, which is biased against the lock nut 14 towards the lock rotor 12 by one or more springs 28.

In the example illustrated in FIG. 7, the lock rotor 14 is connected to rods 32 and 34 via one or more pins 30. Thus, linear movement of the rods in a plane parallel to the plane in which the lock rotor 12 lies causes rotational movement of the lock rotor 12 itself. This rotational movement causes misalignment of the ridge protrusions 20 and the lock protrusions 18, allowing the force from the spring 28 to move the lock follower 16 to push the lock nut 14 through and beyond the ridge protrusions 20 of the lock rotor 12. In some examples, the lock nut 14 is coupled to a shaft 25 having an internal core 26.

Figures 8A, 8B:
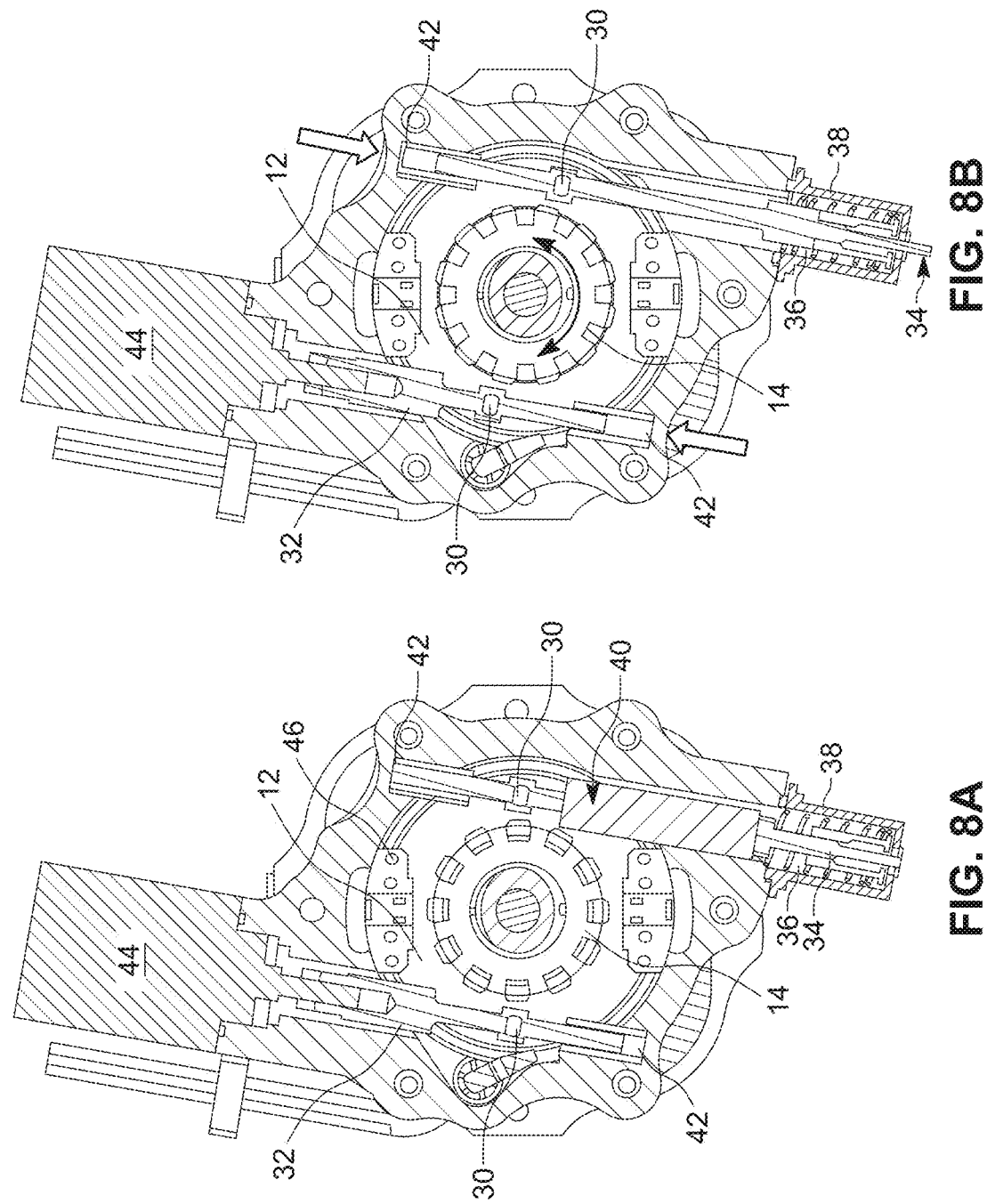
FIGS. 8A and 8B illustrate a plan view of an example lock assembly transitioning from a lock position to an unlock position, in accordance with an example embodiment of the disclosure.

FIGS. 8A and 8B illustrate a plan view of an example lock assembly transitioning from a locked position to an unlocked position, respectively. As shown, the assembly includes a solenoid 44 (and/or another suitable actuator), configured to cause linear movement of rod 32. Rod 32 includes a hole to receive pin 30, which causes rotational movement of the lock rotor 12 in response to linear movement of the rod 32. A void or cavity 42 is arranged in a housing of the assembly to receive a portion of the rod 32, thereby guiding and containing the movement of the rod 32.

Opposite the rod 32 is a rod 34, configured to move linearly in response to, but in a direction opposite from, movement of rod 32. Rod 34 similarly includes a hole to receive a pin 30, which ensures rotational movement of the lock rotor 12 is in a consistent plane. Movement of the rod 34 is accommodated by a void or cavity 42 opposite a cap 38 that supports a spring 36. As shown, the spring 36 applies a force to the rod 34 to have a default locked position. Force from the solenoid 44 can overcome the force from the spring 36 to unlock the assembly. In some examples, an optional volume or weight 40 can be applied to the rod 34 (and/or rod 32) to distribute/balance weights/forces on the assembly during rapid rotational movements. When positioned in an unlocked configuration, as shown in FIG. 8B, a portion of the rod 34 may extend from the cap, providing an indication (e.g., visual, contact, magnetic, etc.) of the position of the assembly.

Although two rods are illustrated, in some examples a single rod can be employed. Further, although a cap and spring are illustrated, in some examples no cap or spring or both are employed. In some examples, a spring can be arranged within a cavity 42 to force rod 32 into a locked position.

Figure 9:
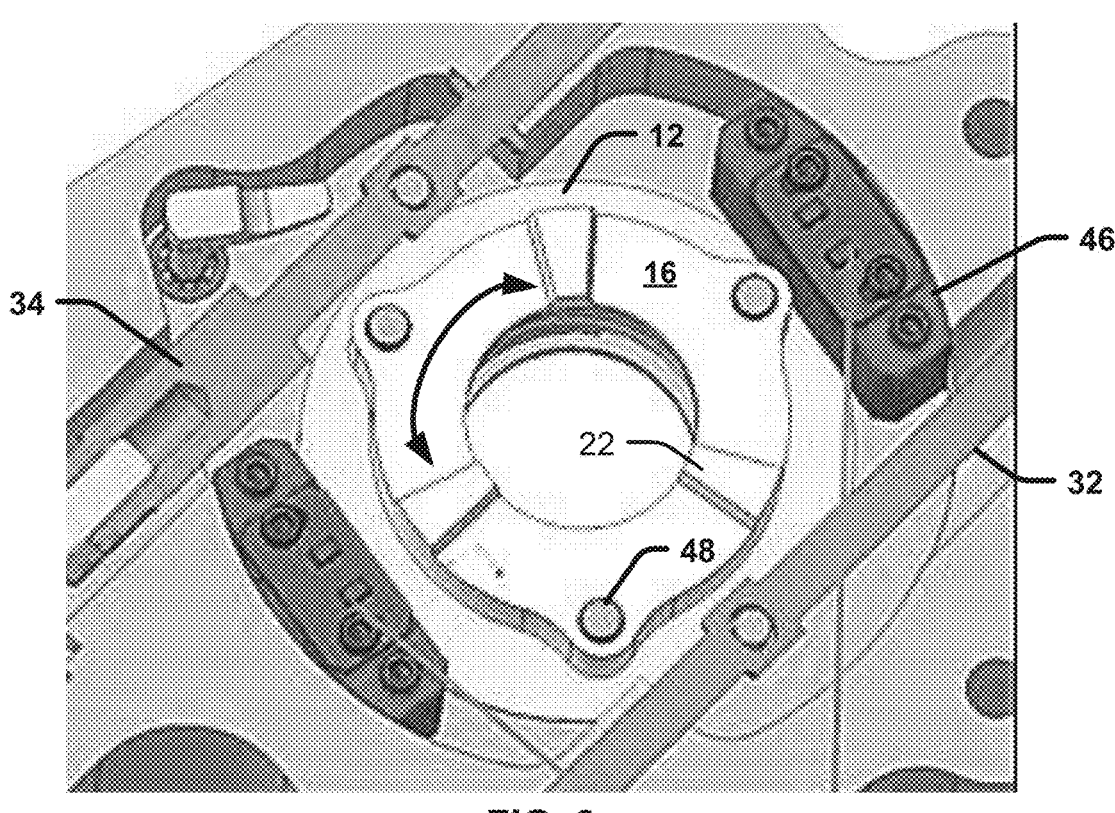
FIG. 9 illustrates a rear view of an example lock assembly of FIGS. 8A and 8B, in accordance with an example embodiment of the disclosure.

FIG. 9 illustrates a view of an example lock assembly of FIGS. 8A and 8B including the lock follower 16. A sensor or sensor assembly 46 can be arranged at one or more locations about the lock follower. As the lock follower rotates, a portion of the lock follower may align or misalign with the sensor 46. For instance, the sensor may be a magnetic (e.g., Hall effect) sensor, arranged to activate when a metallic/ferromagnetic/polarized post 48 is within a threshold distance of the sensor. By this arrangement, the sensor is configured to determine a rotational position of the lock follower, and thereby whether the assembly is in a locked or unlocked position.

Figure 10:
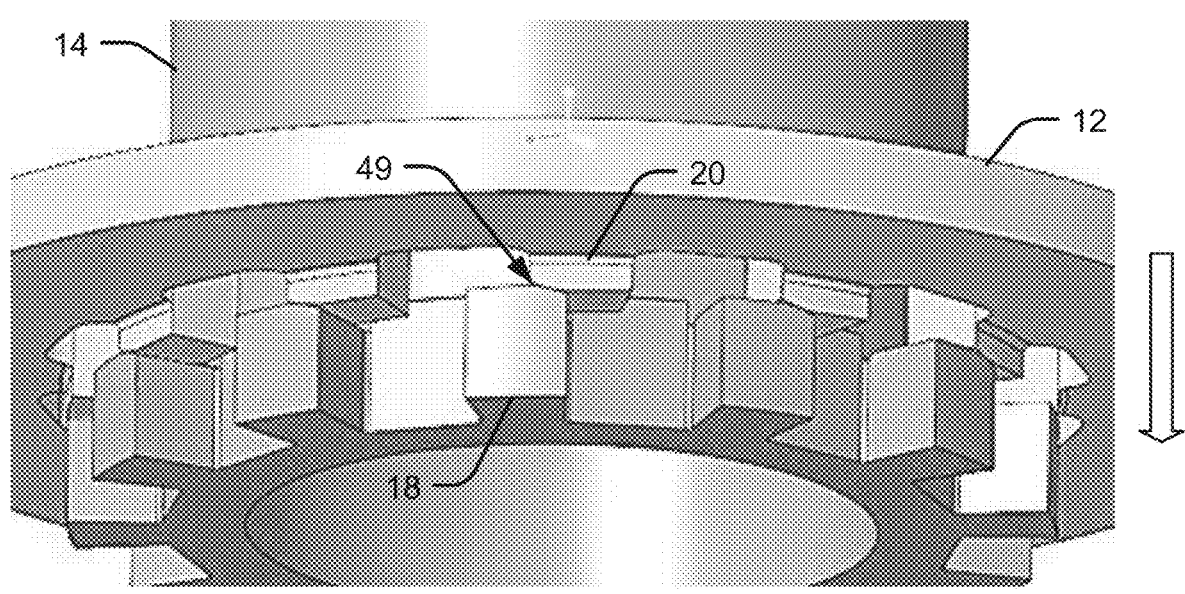
FIG. 10 illustrates a perspective view of an example lock nut and lock plate, in accordance with an example embodiment of the disclosure.
Figure 11:
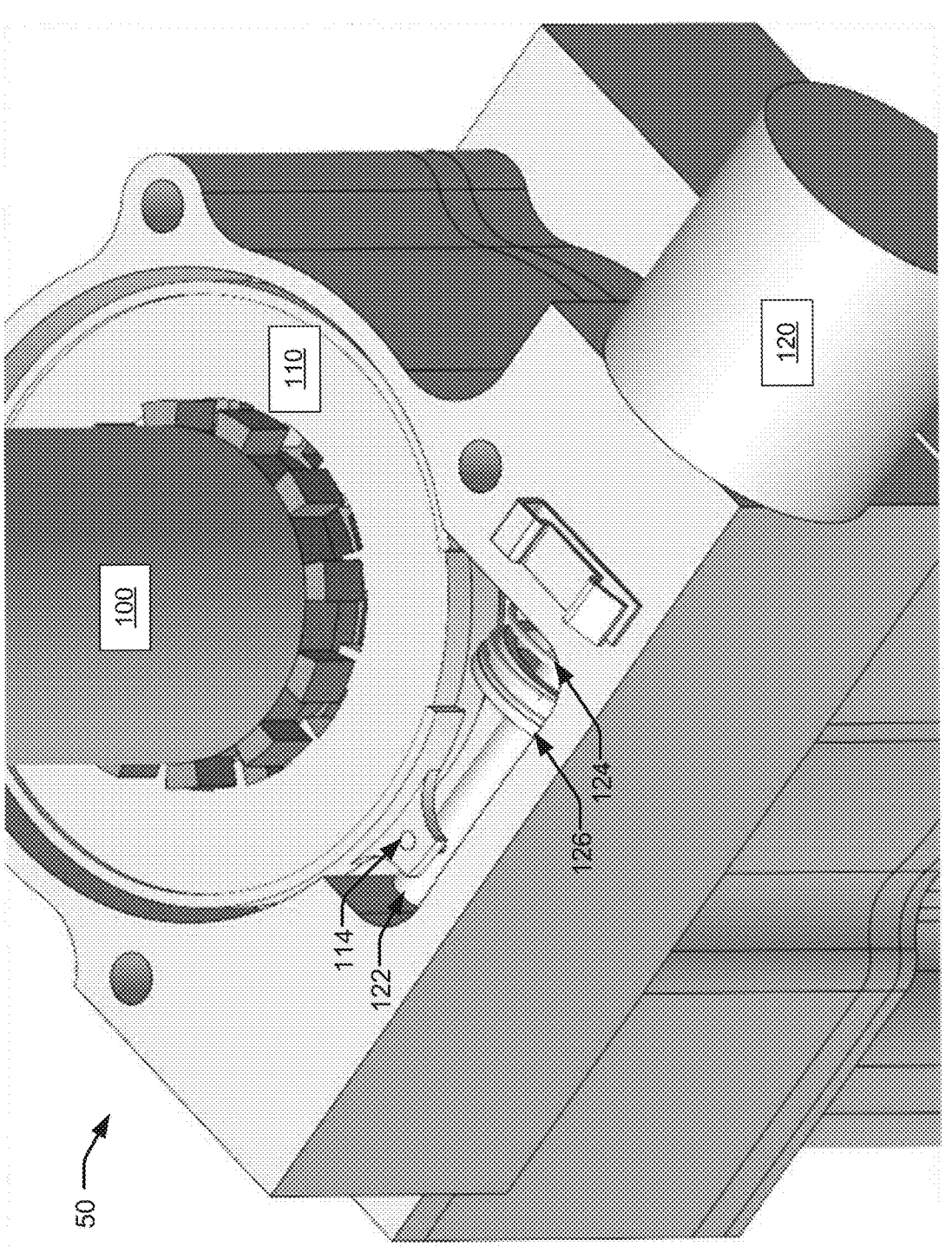
FIG. 11 illustrates a perspective view of an example lock rotor assembly, in accordance with an example embodiment of the disclosure.

FIG. 10 illustrates a perspective view of an example lock nut and lock plate engaging, in accordance with an example embodiment of the disclosure. As shown, the lock nut 14 and the lock rotor 12 and being forced toward one another. However, an amount of overlap is present between the ridge protrusions 20 and the lock protrusions 18. At the interface 49 between the two, an angle or slope can be formed on one or both of the ridge protrusions 20 and the lock protrusions 18, such that forceful engagement would encourage the protrusions to misalign, allow opposing protrusions to pass into spaces between like protrusions, thereby resulting in an unlocked configuration.

Turning now to the examples presented in FIGS. 11 to 18D, FIG. 11 illustrates a perspective view of an example lock rotor assembly 50. The assembly includes a ball nut 100 that is locked or unlocked by rotation of a lock rotor 110.

Rotation of the lock rotor 110 can be controlled by a motor or solenoid 120, which moves a rod 122 linearly. The rod 122 is connected to the lock rotor 110 at a pivot point 114 (e.g., by a bolt, pin, and/or other movable fastener). A spring 124 is held in place along the rod 122 by a plate 126, thereby biasing the rod 122 and lock rotor 110 in the locked position. Thus, actuation of the solenoid serves to rotate the lock rotor 110, thereby releasing the ball nut 100.

Figure 12:
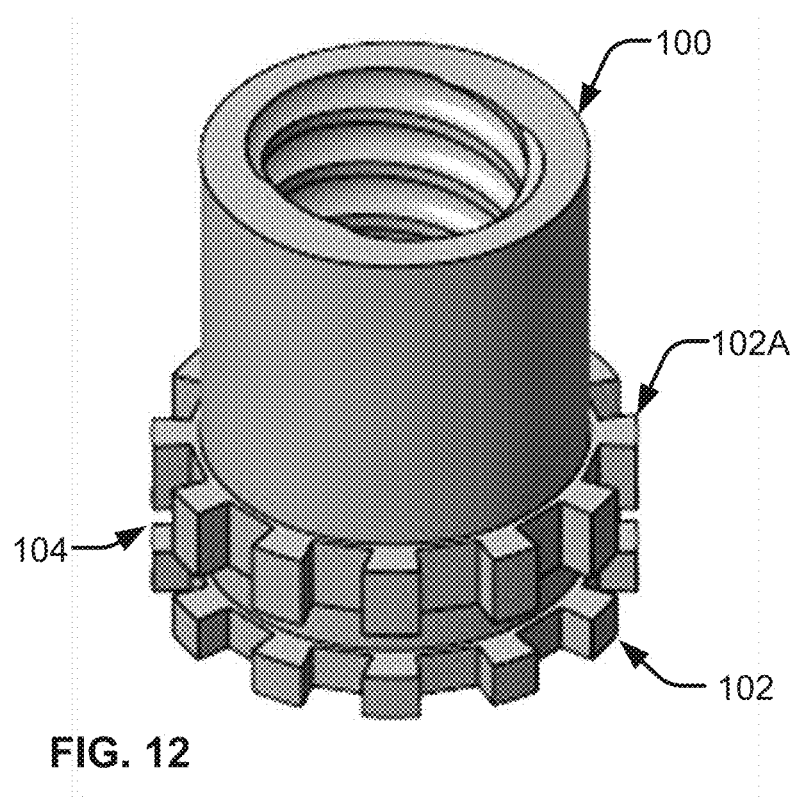
FIG. 12 illustrates a perspective view of an example ball nut employed in the assembly of FIG. 11, in accordance with an example embodiment of the disclosure.
Figure 13:
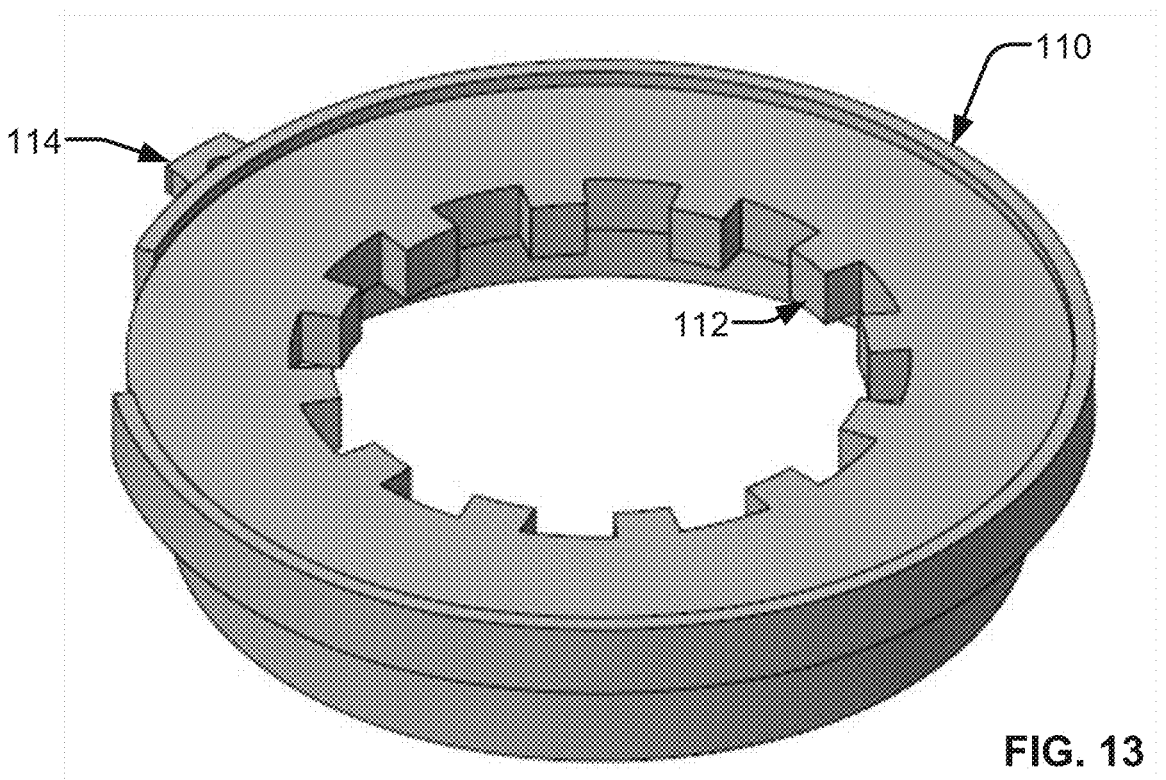
FIG. 13 illustrates a rear perspective view of an example lock rotor employed in the assembly of FIG. 11, in accordance with an example embodiment of the disclosure.
Figure 14:
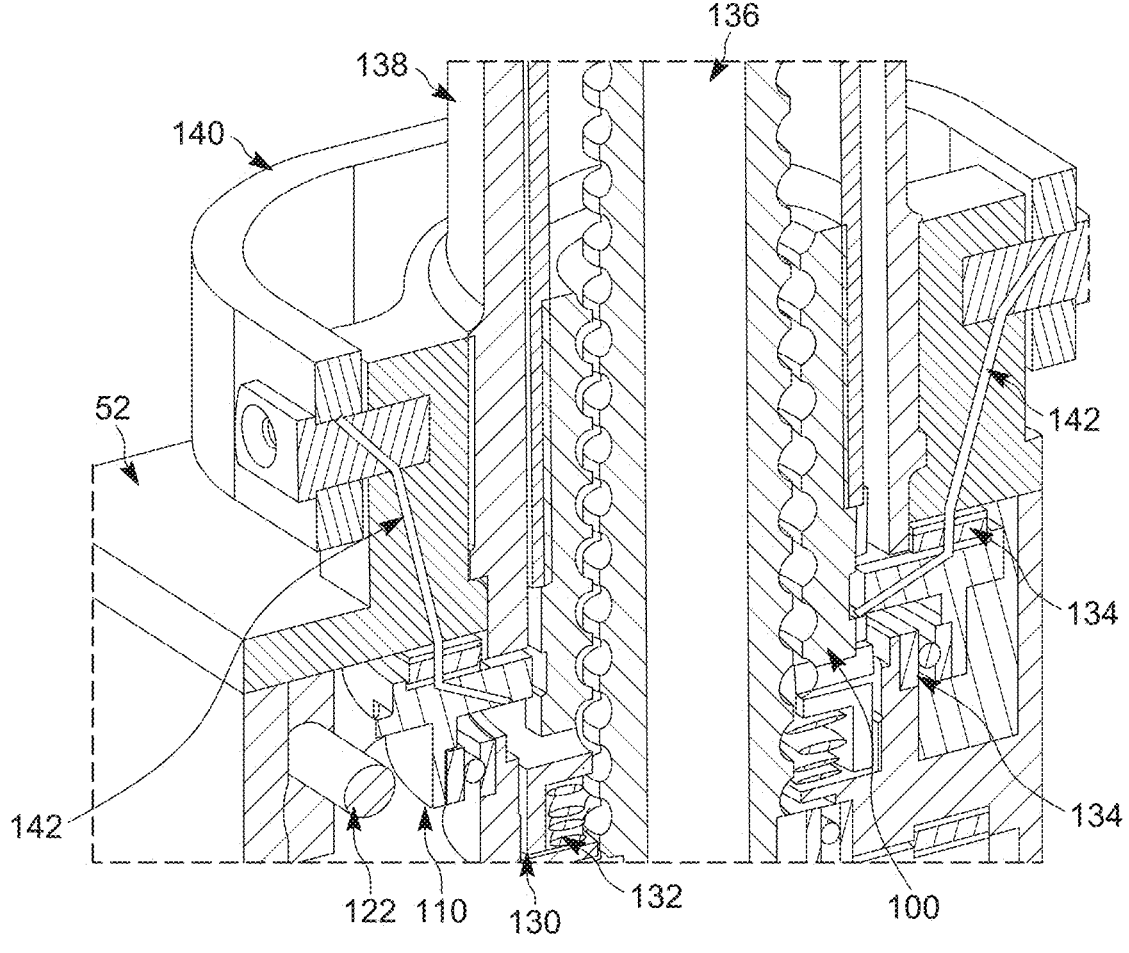
FIG. 14 illustrates a cross-sectional perspective view of the lock assembly of FIG. 11 in a lock position, in accordance with an example embodiment of the disclosure.
Figure 15:
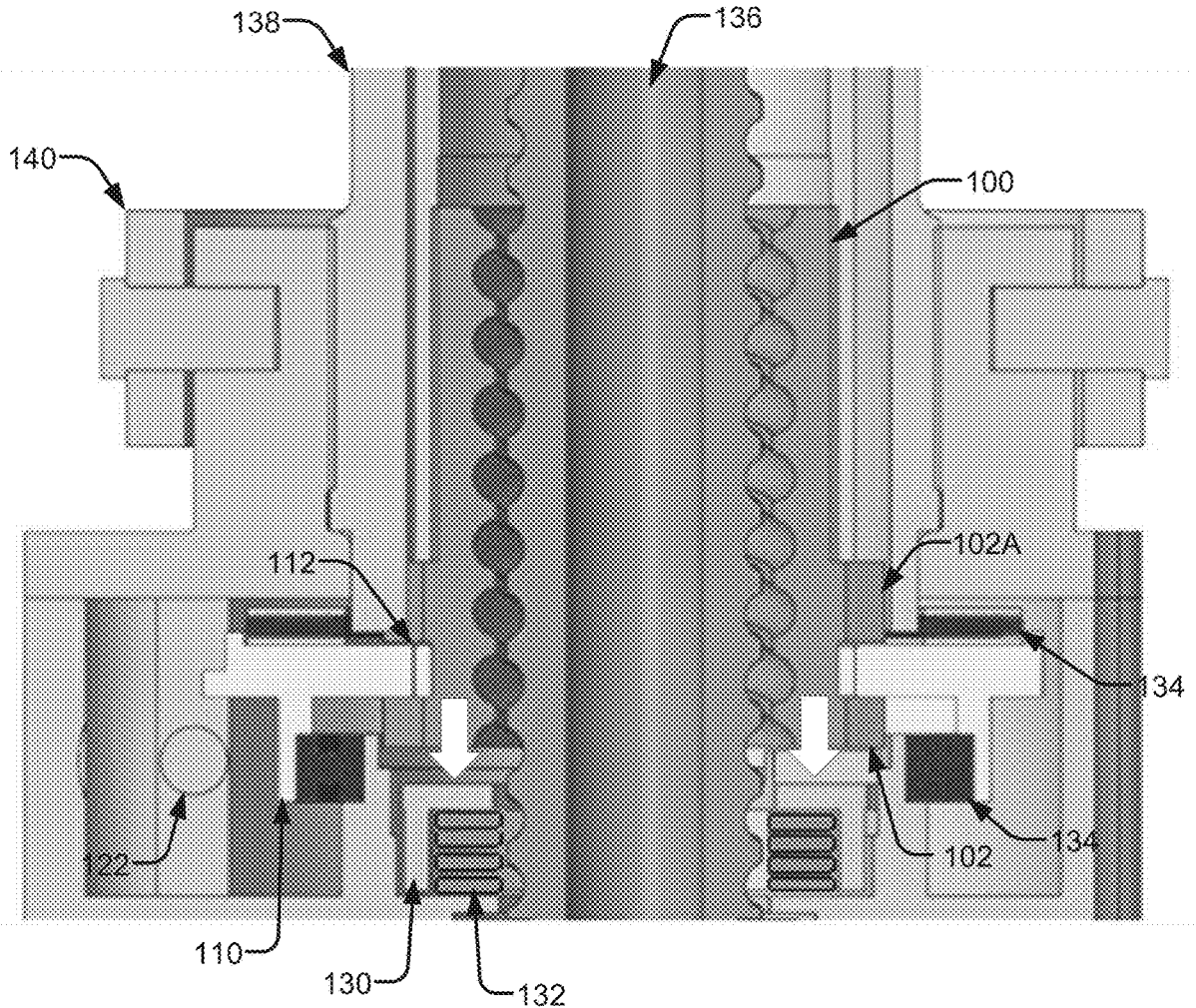
FIG. 15 illustrates another cross-sectional perspective view of the lock assembly of FIG. 11 in a lock position, in accordance with an example embodiment of the disclosure.

FIG. 12 illustrates an example ball nut 100, having a generally cylindrical shape with one or more rows of locking protrusions. For example, a first row of locking protrusions 102 is configured to mate with one or more ridge protrusions 112 of the lock rotor 110 (as shown in FIG. 13). In some alternative examples, first and second rows of locking protrusions 102 and 102A are arranged on an outer circumference of a body of the ball nut 100, which may be separated by a channel 104. For instance, the row of locking protrusions 102A may operate as an anti-rotation feature, which may mate with an internal channel along a length of conduit 138 (as shown in FIGS. 14 and 15). Thus, although some disclosed examples illustrate two rows of locking protrusions, other examples employ a single row of lock protrusions, while realizing the benefits of the disclosed lock assembly.

The example lock rotor 110, shown in FIG. 13, is in a generally toroidal shape and configured to encircle the ball nut 100, providing a ridge with complimentary protrusions 112. In the example of FIG. 12, locking protrusions 102A and 102 are arranged on an outer circumference of the ball nut 100, with protrusions 112 on the ridge arranged to extend between the locking protrusions 102A and 102 in a lock position and fit between adjacent locking protrusions 102A and 102 in an unlock position.

FIG. 14 illustrates a cross-sectional perspective view of the lock assembly 50 in a lock position. As shown, the ball nut 100 encircles a driving shaft 136, which axial causes translation in response to activation of the linear actuator. The lock rotor 110 encircles the ball nut 100, with one or more bearings 134 at interfaces of the assembly and/or linear actuator, thereby stabilizing and/or facilitating rotational movement of the lock rotor 110.

A lock follower 130 is arranged opposite the ball nut 100 relative to the position of the lock rotor 110. The lock follower 130 is biased toward the ball nut 100 by one or more springs 132. The operation of the lock follower 130 is described in greater detail with respect to FIGS. 15-17B.

The linear actuator itself, and the lock assembly 50, can be arranged within a housing 52, with an external conduit 138 supporting movement of the actuator, the driving shaft 136, and/or the ball nut 100. One or more interfaces, supports, and/or handles 140 can provide a load against the lock assembly 50. As shown by lines 142, the load from the interfaces 140 provide forces against the lock rotor 110, such that normal operation and/or positioning of the housing 52 and/or interface 140 biases the ridge of the lock rotor 110 into contact with the locking protrusions 102A and 102 in a lock position.

Operation of the lock assembly 50 will be described with respect to FIGS. 15-17B. FIG. 15 illustrates another cross-sectional view of the lock assembly in a lock position. Often a lock position will force the protrusions into contact (e.g., ridge protrusions 112 against lock protrusions 102). In order to transition to an unlock position, the linear actuator motor (not shown) is activated to move the drive shaft 136 toward the lock follower 130, thereby relieving some force against the lock protrusions 102. Thus, when solenoid 120 is activated and shaft 122 moves, rotation of the lock rotor 110 is relatively smooth.

Figures 16A, 16B:
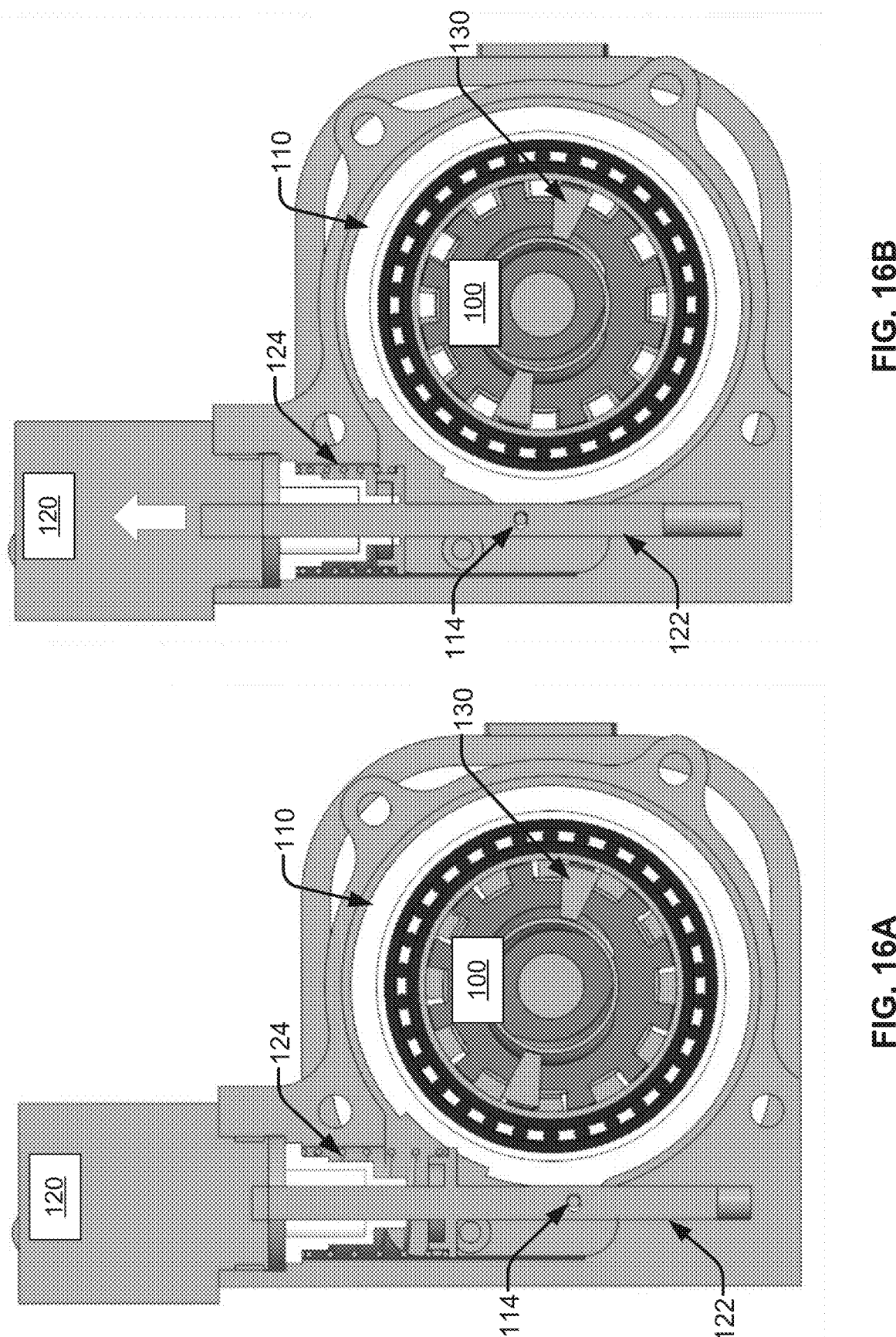
FIGS. 16A and 16B illustrate a first view of the example lock assembly of FIG. 11 transition from a lock position to an unlock position, in accordance with an example embodiment of the disclosure.

FIG. 16A illustrates a first or top down view of the example lock assembly in a lock position. As shown, the rod 122 is extended from the solenoid 120, being biased away from the solenoid 120 by the spring 124. FIG. 16B illustrates the solenoid 120 retracting the rod 122, compressing the spring 124, causing rotation of the lock rotor 110 to allow the lock protrusions 102 to clear the space between ridge protrusions 112 in the unlock position.

Figure 17A:
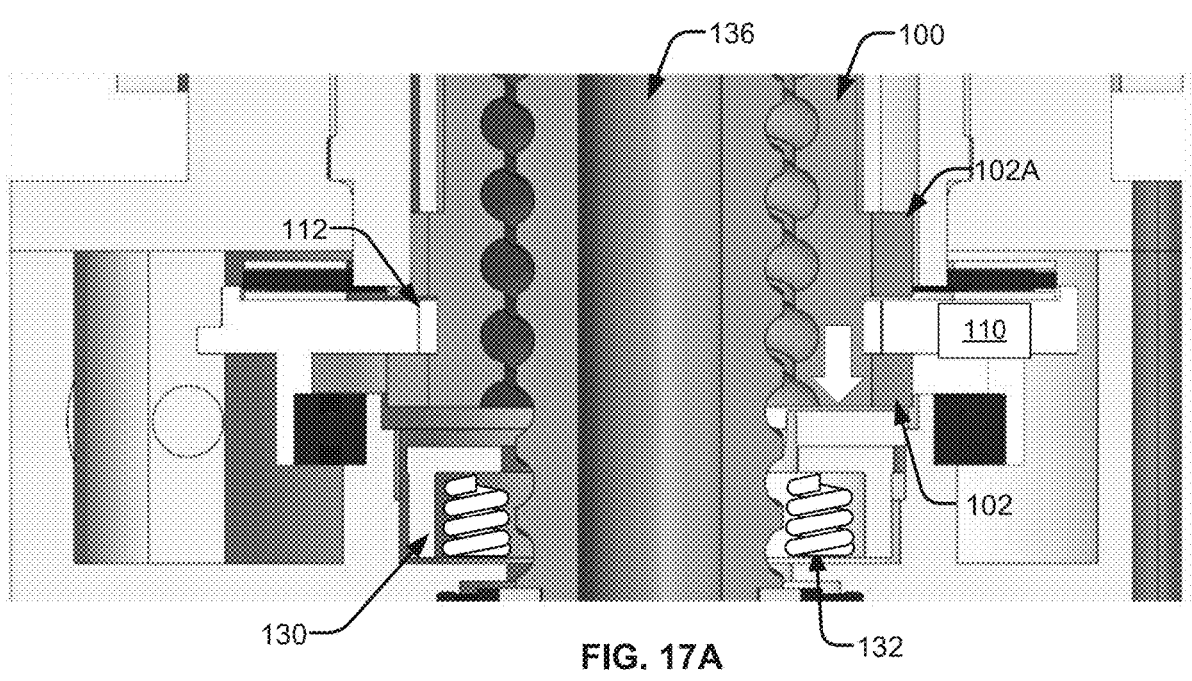
FIGS. 17A and 17B illustrate a cross-sectional view of the example lock assembly of FIG. 11 transition from a lock position to an unlock position, in accordance with an example embodiment of the disclosure.

FIG. 17A illustrates a cross-sectional view of the example lock assembly of in the lock position. If a single row of lock protrusions 102 is employed, the ridge protrusions 112 will align with the ridge protrusions 112 and be locked in place against movement away from the lock follower 130. In the example shown in FIG. 17A, the ridge protrusions 112 are between two rows of lock protrusions 102A and 102, thereby preventing linear translation of the ball nut 100 in either direction. The lock follower 130 is forced away from the lock rotor 110 by the presence of the ball nut 100, thereby compressing springs 132.

Figure 17B:
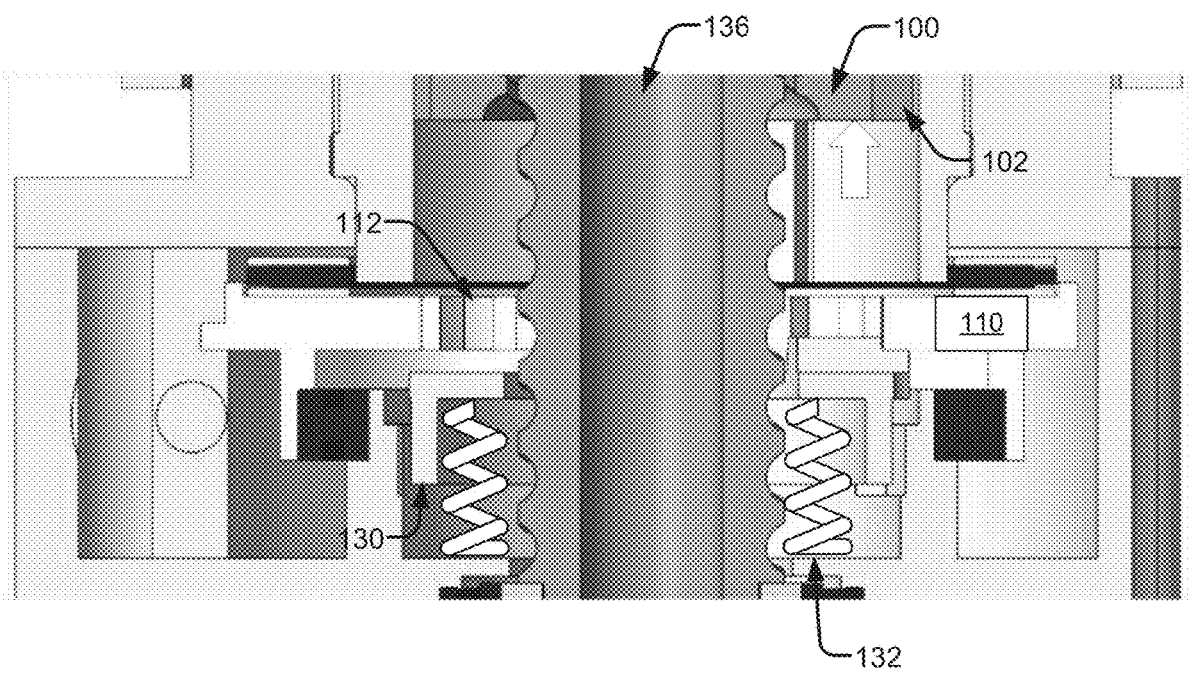

When the lock assembly transitions to an unlock position, as shown in FIG. 17B, the ridge protrusions 112 rotate and become misaligned with the lock protrusions 102 (and, in some examples, 102A). Thus, the ball nut 100 is free to translate from the lock rotor 110, driven by movement of the drive shaft 136, which can be caused by rotational movement and/or axial movement. The lock follower 130 is biased toward the lock rotor 110 by springs 132, and at least part of the lock follower 130 becomes situated within ridge protrusions 112 to arrest rotational movement of the lock rotor 110 in the absence of ball nut 100.

When the lock assembly returns to a lock position, the ball nut 100 forces the lock follower 130 from its position at the lock rotor 110, compressing the springs 132. The lock rotor 110 is then rotated (by movement of rod 122), to situate the ridge protrusions 112 between lock protrusions 102A and 102.

Figure 18B:
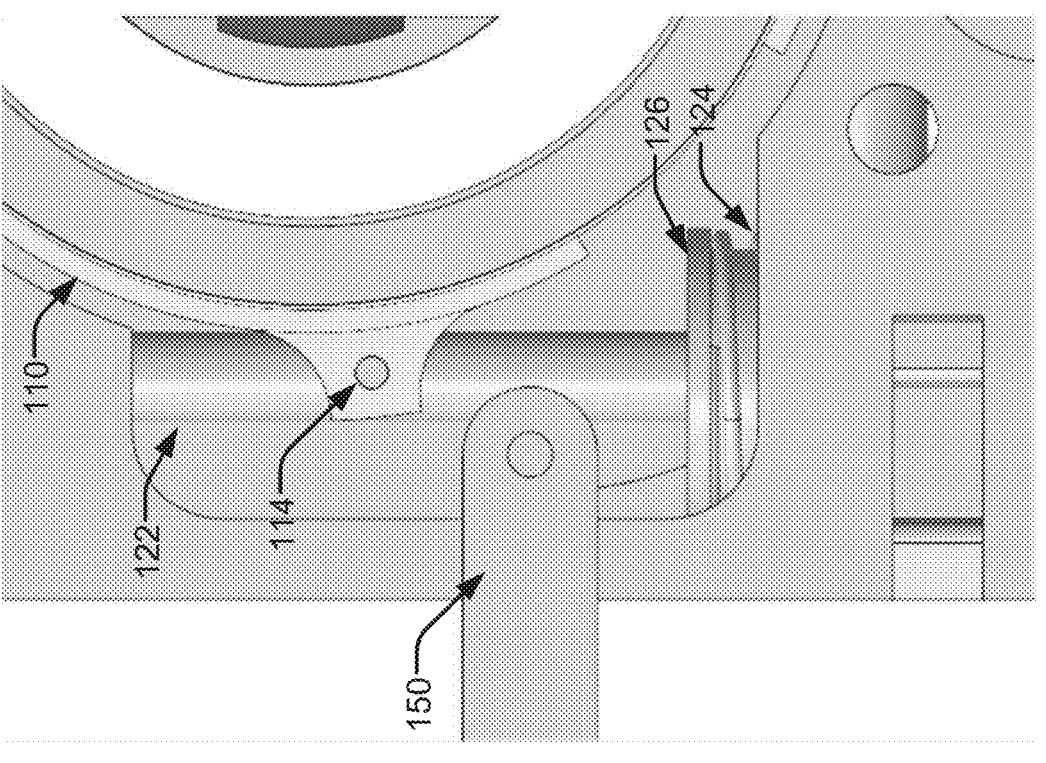
FIGS. 18A to 18D illustrate an example manual control mechanism for a lock assembly, in accordance with an example embodiment of the disclosure.
Figure 18A:
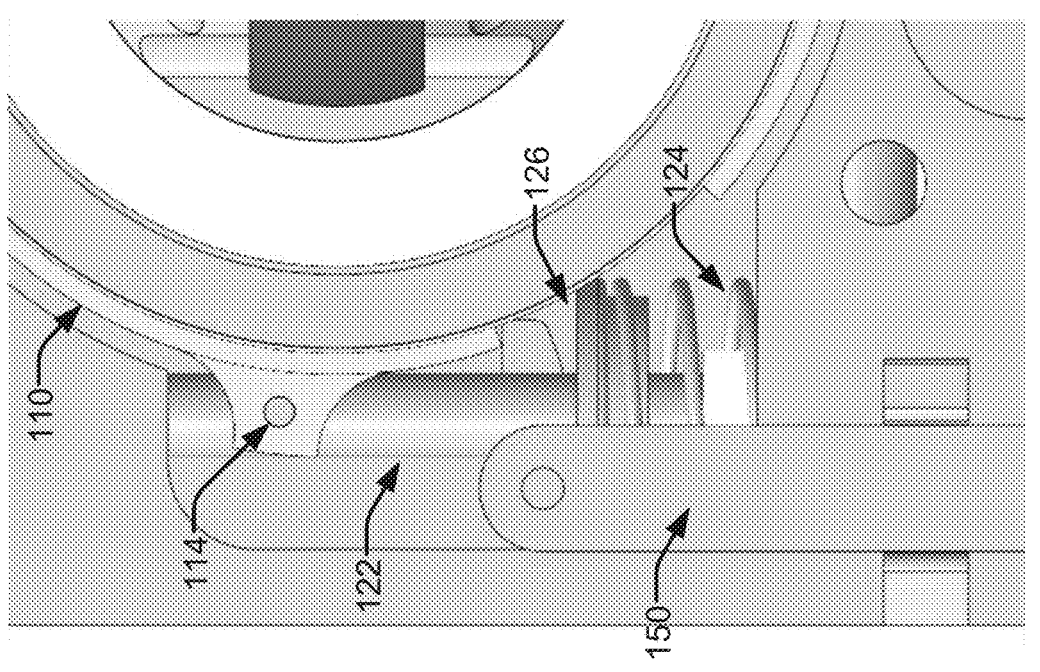
Figures 18C, 18D:
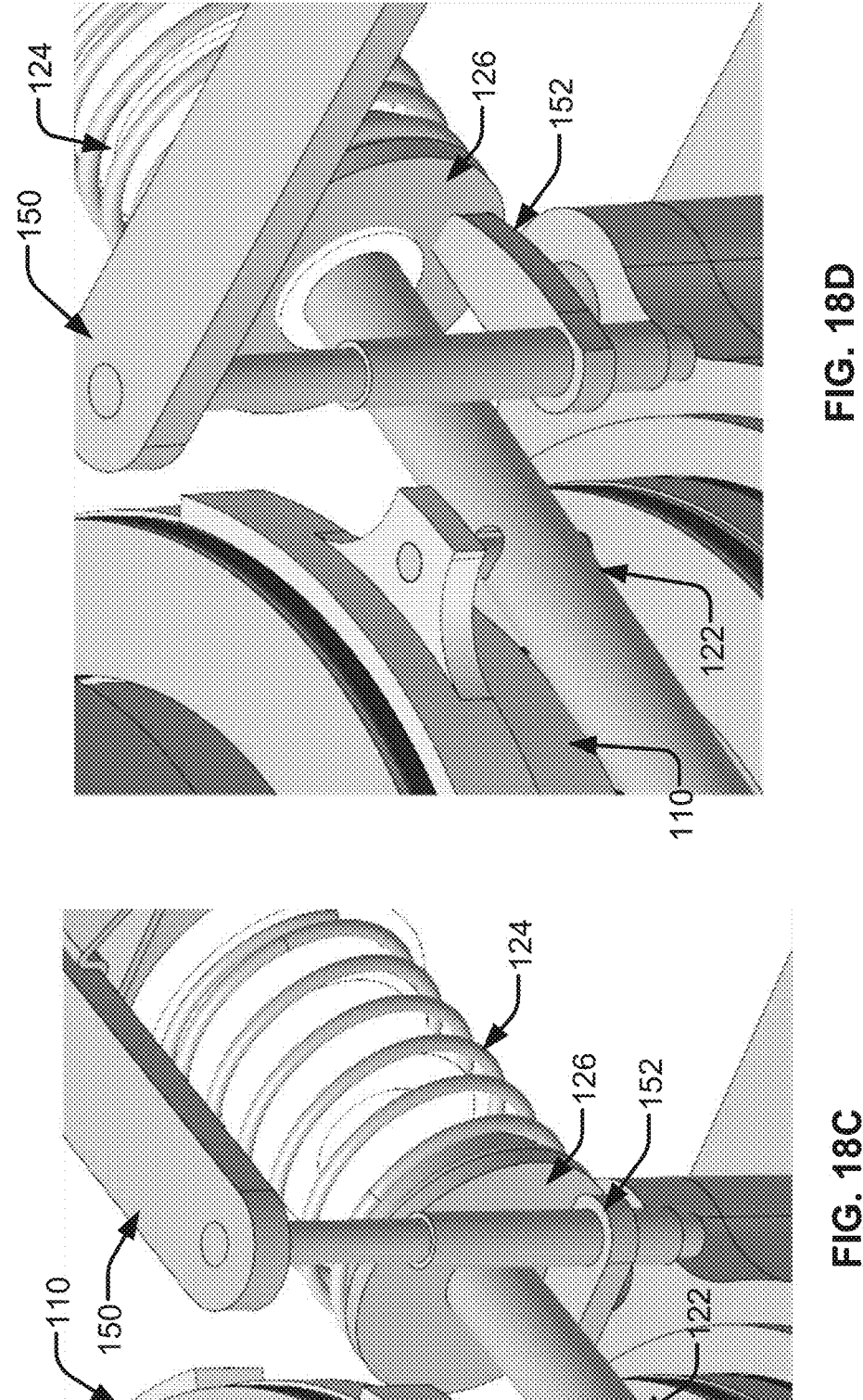

FIGS. 18A to 18D illustrate an example manual control mechanism for a lock assembly. As shown, an external arm 150 is connected to a cam 152 via a post or bolt. Turning the arm 150 causes a like rotation in the cam 152. As shown in FIGS. 18A and 18C, the arm 150 and cam 152 are in a first position corresponding to a lock position. Thus, the spring 124 and rod 122 are extended, forcing the ridge protrusions 112 of the lock rotor 110 to sit between lock protrusions 102A and 102B.

Turning the arm 150 and the cam 152 to a second position, shown in FIGS. 18B and 18D, causes the cam 152 to swing toward plate 126. As the cam 152 forces the plat 126 against the spring 124, the rod 122 retracts, causing the lock rotor 110 to rotate into the unlock position, thereby releasing the ball nut 100.

As utilized herein, "and/or" means any one or more of the items in the list joined by "and/or". For example, "x and/or y" means any element of the three-element set {(x), (y), (x, y)}. Similarly, "x, y, and/or z" means any element of the seven-element set {(x), (y), (z), (x, y), (x, z), (y, z), (x, y, z)}. As utilized herein, the term "module" refers to functions that can be implemented in hardware, software, firmware, or any combination of one or more thereof. As utilized herein, the term "exemplary" means serving as a non-limiting example, instance, or illustration.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A lock assembly for a linear actuator comprising:
a ball nut having one or more rows of lock protrusions extending radially from an external circumference of the ball nut; and
a lock rotor configured to encircle the ball nut, the lock rotor having a row of ridge protrusions extending radially inward from an internal circumference,
wherein the ridge protrusions are aligned with locking protrusions of the one or more rows of lock protrusions when the linear actuator is in a first position, and are misaligned with the locking protrusions of the one or more rows of lock protrusions when the linear actuator is in a second position.

2. The lock assembly of claim 1, wherein the linear actuator is connected to a first rod coupled to a pin, such that movement of the linear actuator from the first to the second position moves the pin.

3. The lock assembly of claim 2, wherein the pin is further connected to the lock rotor, such that movement of the pin causes rotational movement of the lock rotor.

4. The lock assembly of claim 2, further comprising;
a second rod arranged opposite the first rod relative to the lock nut; and
a housing to support the first and second rods, the housing including one or more cavities to receive the first and second rods during movement of the linear actuator.

5. The lock assembly of claim 4, further comprising a balance weight attached to the second rod.

6. The lock assembly of claim 1, further comprising a lock follower biased toward the lock nut or the lock rotor by the spring.

7. The lock assembly of claim 6, wherein the lock follower is configured to maintain a radial position of the lock nut in the locked position, and a radial position the lock rotor in the unlocked position.

8. The lock assembly of claim 1, wherein the linear actuator is a solenoid.

9. A lock assembly comprising:
a lock nut having a plurality of lock protrusions extending radially from an external circumference of the lock nut;
a lock rotor configured to encircle the lock nut, the lock rotor having a plurality of protrusions extending radially inward from an internal circumference; and
a linear actuator connected to the lock rotor and configured to move the lock rotor from a locked position to an unlocked position.

10. The lock assembly of claim 9, further comprising the one or more rods, wherein the linear actuator is connected to the lock rotor via one or more pins connected to the one or more rods.

11. The lock assembly of claim 9, further comprising a balancing volume fixed to a rod of the one or more rods.

12. The lock assembly of claim 9, further comprising a lock follower biased toward the lock nut and the lock rotor by the spring, the lock follower having one or more posts arranged on one or more portions of the lock follower.

13. The lock assembly of claim 12, further comprising one or more sensors arranged about the lock follower, the lock follower having one or more posts to activate the sensor.

14. The lock assembly of claim 13, wherein the lock follower is configured to maintain a radial position of the lock nut in the locked position, and a radial position the lock rotor in the unlocked position.

15. The lock assembly of claim 9, wherein one or more of the plurality of ridge protrusions has a substantially angled portion configured to overlap an opposing substantially angled portion of one or more of the plurality of lock protrusions.

16. The lock assembly of claim 15, wherein forcing the substantially angled portion of the one or more of the plurality of ridge protrusions against the opposing substantially angled portion of one or more of the plurality of lock protrusions causes the plurality of ridge protrusions and the plurality of lock protrusions to misalign, allowing the plurality of ridge protrusions to pass into spaces between the opposing plurality of lock protrusions, resulting in an unlocked configuration.

17. A lock assembly for a linear actuator comprising:
a ball nut having one or more rows of lock protrusions extending radially from an external circumference of the ball nut; and
a lock rotor configured to encircle the ball nut, the lock rotor having a row of ridge protrusions extending radially inward from an internal circumference,
wherein the ridge protrusions are arranged between locking protrusions of the one or more rows of lock protrusions in a lock position, and are arranged between adjacent locking protrusions of the one or more rows of lock protrusions in an unlock position.

18. The lock assembly of claim 17, further comprising:
a solenoid to rotate the lock rotor; and
a spring to bias the solenoid such that the lock rotor is in a lock position in the absence of power.

19. The lock assembly of claim 17, further comprising:
a lock follower to maintain the lock rotor in an unlock position in the absence of the ball nut; and
one or more springs to bias the lock follower against the ball nut in a lock position.

20. The lock assembly of claim 17, wherein the one or more rows comprises first and second rows separated by a channel.

* * * * *